Jan. 30, 1951   N. T. JOHNSON ET AL   2,540,032
TEMPLATE FOR MARKING SWITCH AND OUTLET BOX OPENINGS
Filed Nov. 20, 1947
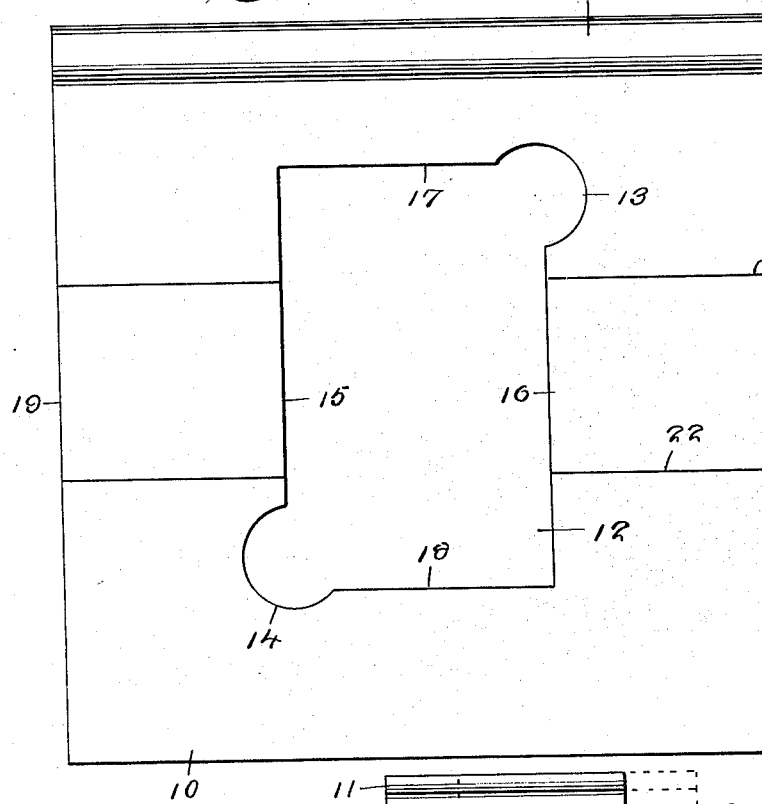
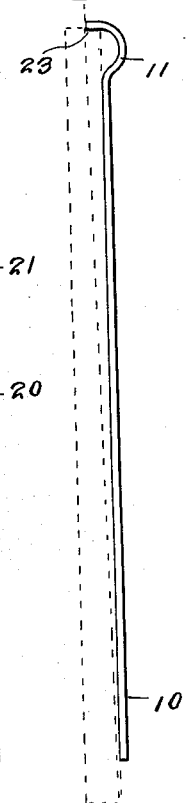
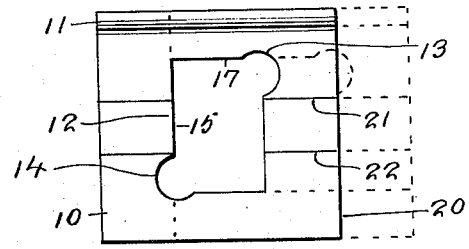
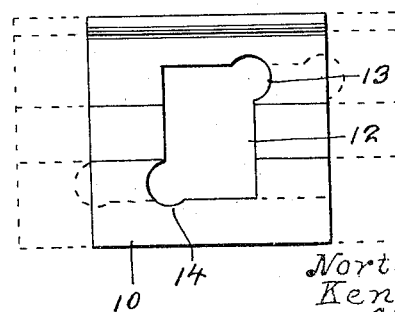
INVENTOR.
Norton T. Johnson
Kenneth B. Allen
BY Victor J. Evans & Co.
ATTORNEYS Patented Jan. 30, 1951

2,540,032

UNITED STATES PATENT OFFICE 2,540,032

TEMPLATE FOR MARKING SWITCH AND OUTLET BOX OPENINGS

Norton T. Johnson and Kenneth B. Allen, Browns Valley, Minn.

Application November 20, 1947, Serial No. 787,150

1 Claim. (Cl. 33—174)

This invention relates to templates particularly used for cutting openings for electrical equipment, and in particular a template adapted to be used as a guide for marking openings to be cut out for the installation of single, double, or triple gang switch or outlet boxes.

The purpose of this invention is to facilitate marking openings for single, double, and triple outlet boxes by providing a single template that may be used for a single box, or slid along to mark an opening for a double box, or slid in both directions to mark an opening for a triple outlet box.

Templates have been used for various purposes and some of these have been moved from one position to another to increase the size of an opening but in marking the shape and size of openings to be cut for outlet boxes on the face of walls and the like it is difficult to accurately measure the distance the template should be moved to double or triple the size of the opening required for the box. With this thought in mind this invention contemplates a template in the form of a stencil which is formed of a flat plate with a guiding ledge at the upper edge and an opening in the form of the opening required for an outlet box therein, and the opening is spaced from the side edges predetermined distances so that after marking through the opening a line may be placed along one side and used as a guide to indicate the position to which the template is moved to mark the opening for a larger size box.

The object of this invention is to locate an opening for outlet boxes in a template wherein the distance from the side of the opening to the side of the plate represents the distance the template is moved to mark an opening for a larger box.

Another object of the invention is to provide a template having a guiding ledge along the upper edge that facilitates locating the template with the opening therein in the proper position on a board or the like and also provides means for positioning the template square.

Another object of the invention is to provide a template for outlet boxes that has lath marks thereon wherein with the lath marks on a center lath the upper and lower laths will be cut the proper amount to provide fastening means for the box.

A further object of the invention is to provide a template for marking openings for switch and outlet boxes which is of a simple and economical construction.

With these and other objects and advantages in view the invention embodies the new and novel combination, construction, and arrangement of parts as hereinafter more fully described, set forth in the claim appended hereto, and disclosed in the accompanying drawings forming part hereof, wherein:

Figure 1 is a plan view of the template.

Figure 2 is an end elevation or edge view showing the template in position upon a board with the board indicated in dotted lines.

Figure 3 is a view similar to that shown in Figure 1 showing the template moved over to the position for marking an opening for an outlet box of the double type in dotted lines.

Figure 4 is a similar view showing the template moved toward each side in dotted lines in order to mark an opening for a triple outlet box.

Referring now to the drawings wherein like reference characters indicate corresponding parts the template of this invention comprises a flat plate 10 having a rolled upper edge 11, and an opening 12 which represents an area to be cut to provide an opening for installing a switch or outlet box.

The plate 10 is of rectangular shape and the opening 12 is also rectangular with arcuate sections 13 and 14 in opposite corners. The opening 12 is formed with sides 15 and 16 and ends 17 and 18, and the distance from the sides 15 and 16 to corresponding sides 19 and 20 of the plate represents the distance the plate is moved toward one side or the other to mark an opening for a larger outlet box. The plate is also provided with lath marks 21 and 22 and the roll 11 at the upper edge is provided with an extending ledge 23 as shown in Figure 2.

With the plate formed in this manner an opening for a single switch or outlet box may readily be marked by marking around the opening 12, and when an opening for a double outlet box is required a line is marked along the side 20 and then the plate is moved over until the side 16 registers with the line marked by the side 20 and the lines are then continued along the ends 17 and 18 and around the corner 13. The distance between the sides 16 and 20, therefore, is predetermined and indicates the exact distance the template should be moved to the right, as indicated by the dotted lines in Figure 3, in order to increase the size of the opening so that it will take a double outlet box.

To mark an opening for a triple outlet box, marks are placed along the ends 17 and 18 of the opening 12 and at both of the sides 19 and 20, and the template is first moved until the side 16 registers with the line marked along the side 20, and then moved in the opposite direction until the side 15 registers with the line marked along the side 19. In all three positions the lines are marked along the ends 17 and 18, and with the side 16 positioned on the line marked by the side 20 the marking is continued along the side 16 and in the corner 13, and with the side 15 positioned on the line marked by the side 19 the marking is continued along the side 15 and in the corner 14. By the same means the marks may be continued for any number or for a gang of outlet boxes.

The ledge 23 at the edge of the bead or roll 11 provides means for squaring the template, particularly on boards, and it will be noted that the opening 12 is positioned above the center of the template so that it will be substantially centered on six inch boards which are usually dressed under size. The roll 11 facilitates using the template on rough boards or boards with rough or slivered edges.

In combining or ganging sectional switch or outlet boxes it is necessary to remove the adjoining sides so that the width of two boxes is slightly less than twice the width of one box, and as it is desired to cut openings that hold the boxes snug it is important that templates be used to provide the exact size. These distances are predetermined in the template as herein described so that all calculations in the field are eliminated.

The lath marks 21 and 22 are used to position the template on a plastered wall so that an outlet box will cut through one lath with the upper end notched into a lath above and with the lower end notched into a lath below. The intermediate lath is first located and then the template is held with the lath marks 21 and 22 on the upper and lower edges of the lath respectively. With the template held in this manner the wall or other surface may be marked to provide notches of the proper depth in adjoining laths.

It will be understood that modifications may be made in the design and arrangement of the parts without departing from the spirit of the invention.

What is claimed is:

In a template for cutting outlet box openings in walls and the like, the combination which comprises a rectangular shaped plate having a rolled edge, said edge being substantially semi-circular in cross section and having a lip on the outer side extended beyond the plane of the plate for engagement with a lath against which the plate is positioned, said plate having a centrally disposed rectangular shaped opening having long and short sides therein with the short side parallel to the said rolled edge and with substantially semi-circular recesses extended diagonally outwardly from opposite corners of the said opening, and the face of said plate having pairs of parallel lines thereon extended perpendicularly from the long sides of the said opening to the edges of the plate, said lines positioned to represent the location of a lath with the lip at the side of the rolled edge positioned over the edge of a juxta-positioned lath.

NORTON T. JOHNSON.
KENNETH B. ALLEN.

REFERENCES CITED

The following references are of record in the file of this patent:

UNITED STATES PATENTS

| Number | Name | Date |
| --- | --- | --- |
| 831,242 | Robison | Sept. 18, 1906 |
| 1,630,429 | Hobbisiefken | May 31, 1927 |
| 1,682,035 | Clark | Aug. 28, 1928 |
| 1,685,109 | Weber | Sept. 25, 1928 |
| 1,973,364 | Wood | Sept. 11, 1934 |
| 2,334,913 | Eisenberg | Nov. 23, 1943 |
| 2,458,072 | Hall | Jan. 4, 1949 |

FOREIGN PATENTS

| Number | Country | Date |
| --- | --- | --- |
| 16,608 | England | 1907 |